United States Patent
Hillenbrand et al.

(10) Patent No.: US 7,430,200 B2
(45) Date of Patent: Sep. 30, 2008

(54) ARRANGEMENT AND METHOD FOR CONTROLLING COMMUNICATION CONNECTIONS

(75) Inventors: Markus Hillenbrand, Kaiserslautern (DE); Harald Müller, Gilching (DE); Paul Müller, Trippstadt (DE); Ye Yuan, Wiesloch (DE)

(73) Assignee: Siemens Aktiengesellschaft, Munich (DE)

( * ) Notice: Subject to any disclaimer, the term of this patent is extended or adjusted under 35 U.S.C. 154(b) by 671 days.

(21) Appl. No.: 10/953,310

(22) Filed: Sep. 29, 2004

(65) Prior Publication Data
US 2005/0068962 A1    Mar. 31, 2005

(30) Foreign Application Priority Data
Sep. 30, 2003    (DE) ............... 103 45 548

(51) Int. Cl.
*H04L 12/66* (2006.01)
(52) U.S. Cl. .................... 370/352; 370/522
(58) Field of Classification Search ............ None
See application file for complete search history.

(56) References Cited

U.S. PATENT DOCUMENTS

| 7,068,647 B2 * | 6/2006 | Fangman et al. ............ 370/352 |
| 2003/0123432 A1 * | 7/2003 | Cheng et al. ................ 370/352 |
| 2004/0042607 A1 * | 3/2004 | Gallant et al. .......... 379/220.01 |

* cited by examiner

*Primary Examiner*—Chau T. Nguyen
*Assistant Examiner*—Kenneth R Hartmann, II

(57) ABSTRACT

Arrangements and methods for controlling communication connections in a packet-oriented communication system are provided. A communication master computer controls communication connections based on exchanged signaling messages of a respectively preset communication protocol and a service provider unit supplies communication services for establishing and controlling connections based on bi-directional communication service calls with a service user unit. An interface to couple the service provider unit with the service user unit is provided. Additionally an interface to couple the master computer with the service provider unit is provided. Parameters are extracted from a received signaling message for assignment to a communication service.

7 Claims, 5 Drawing Sheets

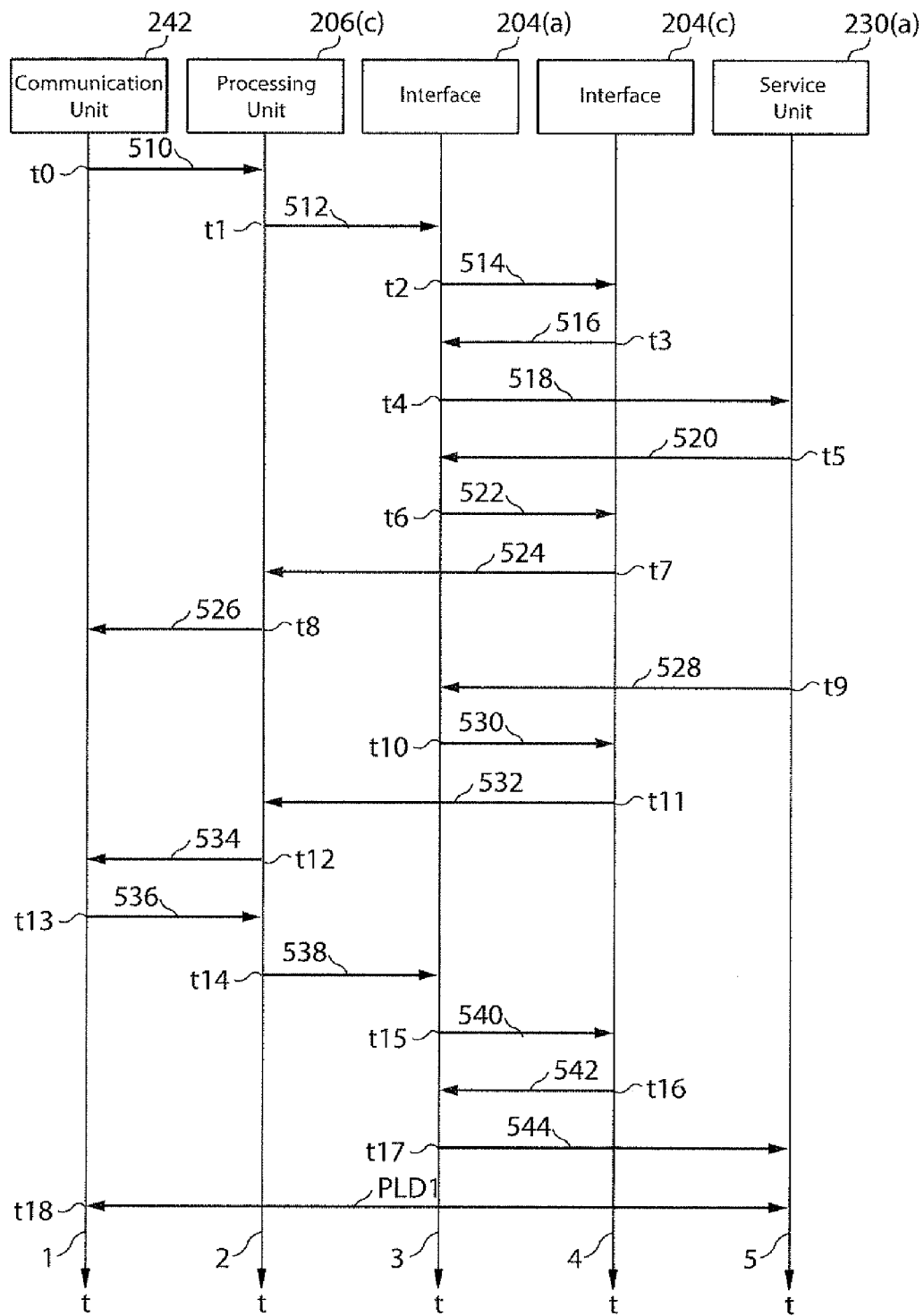

ARRANGEMENT AND METHOD FOR CONTROLLING COMMUNICATION CONNECTIONS

CROSS REFERENCE TO RELATED APPLICATIONS

This application claims priority to the German application No. 10345548.5 DE, filed Sep. 30, 2003 and which is incorporated by reference herein in its entirety.

FIELD OF INVENTION

The invention relates to an arrangement and a method for controlling communication connections for packet-oriented real-time communication between two communication users.

BACKGROUND OF INVENTION

As well as transmitting data, current packet-oriented networks are used increasingly for transmitting communication data or real-time communication data. The transmission of communication data via a packet-oriented network is often also referred to as Voice over IP or VoIP. The term VoIP thereby refers to a technology for transmitting useful data, such as voice, and an exchange of signaling data for controlling connections via packet-oriented networks.

Two standard protocols for the implementation of VoIP, specifically H.323 and SIP, are known for the packet-oriented transmission of communication data between two users and for switching users and providing performance features.

SIP (Session Initiation Protocol) is a standard proposed by the Internet Engineering Task Force (IETF) for signaling connections via packet-oriented networks and is currently predominantly deployed in the field of internet telephony and for further services such as conference interactions, event notification, message transmission, etc.

The standard H.323 is an international ITU-T standard (International Telecommunication Union—Telecommunication Standardization Sector) for voice, data and video communication via packet-oriented networks, ensuring mutual interoperability of proprietary products.

For the implementation of packet-oriented communication technologies in a communication system, the problem frequently occurs that the above-mentioned protocols H.323 und SIP have to coexist, in order to be able to link communication terminals operating according to the respective communication protocol. It is not however possible for a SIP communication terminal to communicate with an H.323-compatible communication terminal without the provision of further technical devices.

Previous VoIP solutions have been based on so-called standalone software. Standalone software refers to software installed in the communication terminal or—in more general form—in a client to process both signaling data and payload data. One disadvantage of such a solution is that any change to the communication protocol and any introduction of new additional performance features can only be implemented by updating said software at every terminal. For a company this measure requires a great deal of configuration work and therefore a significant cost expenditure.

A further problem is the complexity of said software. As new performance and service features are introduced, said software becomes more and more complex and extensive. The software implemented in the communication terminal—client software—not only has to identify newly added performance features, it must also be able to implement methods to execute said performance features.

With extensive standalone software, integration into applications not provided for communication purposes is problematic. To develop said applications, already existing VoIP functions generally have to be adapted or developed from new. Furthermore the integration of additional performance features from third party manufacturers is almost excluded.

Some VoIP applications provide programming interfaces for integration into other applications and these are known in specialist circles as Application Program Interfaces, API. However a further compilation process is generally required to integrate said programming interfaces into other applications.

The use of so-called gateways is known as a means to ensure the interoperability of the VoIP communication protocols H.323 and SIP. A gateway thereby converts signaling data based on the SIP protocol to a format suitable for H.323 and vice-versa. It is often the case here however that protocol elements of a respective communication protocol are incompatible with protocol elements of the other communication protocol. It is also often the case that one of the two communication protocols supports services, applications, processing methods, etc. which are not supported in the other communication protocol.

To avoid the problems associated with updating standalone software as discussed above, some service providers offer VoIP solutions as so-called web applications. Obtaining a so-called applet via a packet-oriented data network and integrating it in a browser environment in the form of a so-called plug-in allows the execution of a VoIP functionality via a web browser. Such an above-mentioned execution improves the above-mentioned update problem but offers no opportunity for seamless integration into any applications.

SUMMARY OF INVENTION

The object of the invention is to provide a communication environment, the deployment of which avoids the problems of the prior art.

The object is achieved by the claims.

According to the invention at least one communication master computer is provided in a packet-oriented communication system to control communication connections based on exchanged signaling messages—for example SIP or H.323—of a respectively preset communication protocol. At least one service provider unit is also provided to supply communication services for establishing and controlling connections based on bi-directional communication service calls with at least one service user unit. These communication services are provided particularly as web services. The service provider unit is configured with interfaces with the at least one service user unit and with the at least one communication master computer and includes means for characterizing a received signaling message and for extracting parameters contained in the signaling message and for assigning to a communication service. The service provider unit also includes means for generating at least one signaling message further to a communication service call of the at least one service user unit.

One significant advantage of the inventive method is that the communication services for establishing and controlling connections are moved from a communication terminal—such as a so-called SIP phone or a communication terminal operating according to the standard H.323.—to a central service provider unit.

The complex and time-consuming update measures that previously had to be taken in the service user units or clients are therefore not necessary with the inventive means.

The inventive communication services advantageously take over all the signaling tasks of the client, from the point of view of which the inventive service provider unit acts as proxy. The role of proxy means that all communication with the client takes place in both directions between said client and the proxy.

The inventive arrangement proves to be particularly advantageous even with the provision of additional performance features that have to be supported in the communication system. This frequently occurring update measure also only affects the service provider units, while only new or modified abstract communication service calls occur for the service user units.

One particular advantage of the preferably 3-tier architecture with a level arranged between the communication master computers and the service user units acting as communication terminals—implemented in the service provider unit—is the loose coupling and simple integration of communication services—in some instances in the form of so-called web services—into other applications, whereby said integration is advantageously both independent of the programming language used for the application and also independent of the operating system provided for execution of the service user units or the application.

The communication services are advantageously independent of the communication protocols existing or co-existing in the communication system and are therefore also suitable for deployment in communication systems with heterogeneous communication protocols.

Advantageous developments of the invention are specified in the dependent claims.

An exemplary embodiment with further advantages and configurations of the invention is described in more detail below with reference to the drawing, in which:

BRIEF DESCRIPTION OF THE DRAWINGS

FIG. 5: shows a chronological flow diagram to illustrate schematically an exchange of signaling messages and control messages to establish a connection between a communication unit and a service user unit;

DETAILED DESCRIPTION OF INVENTION

Figure 1:
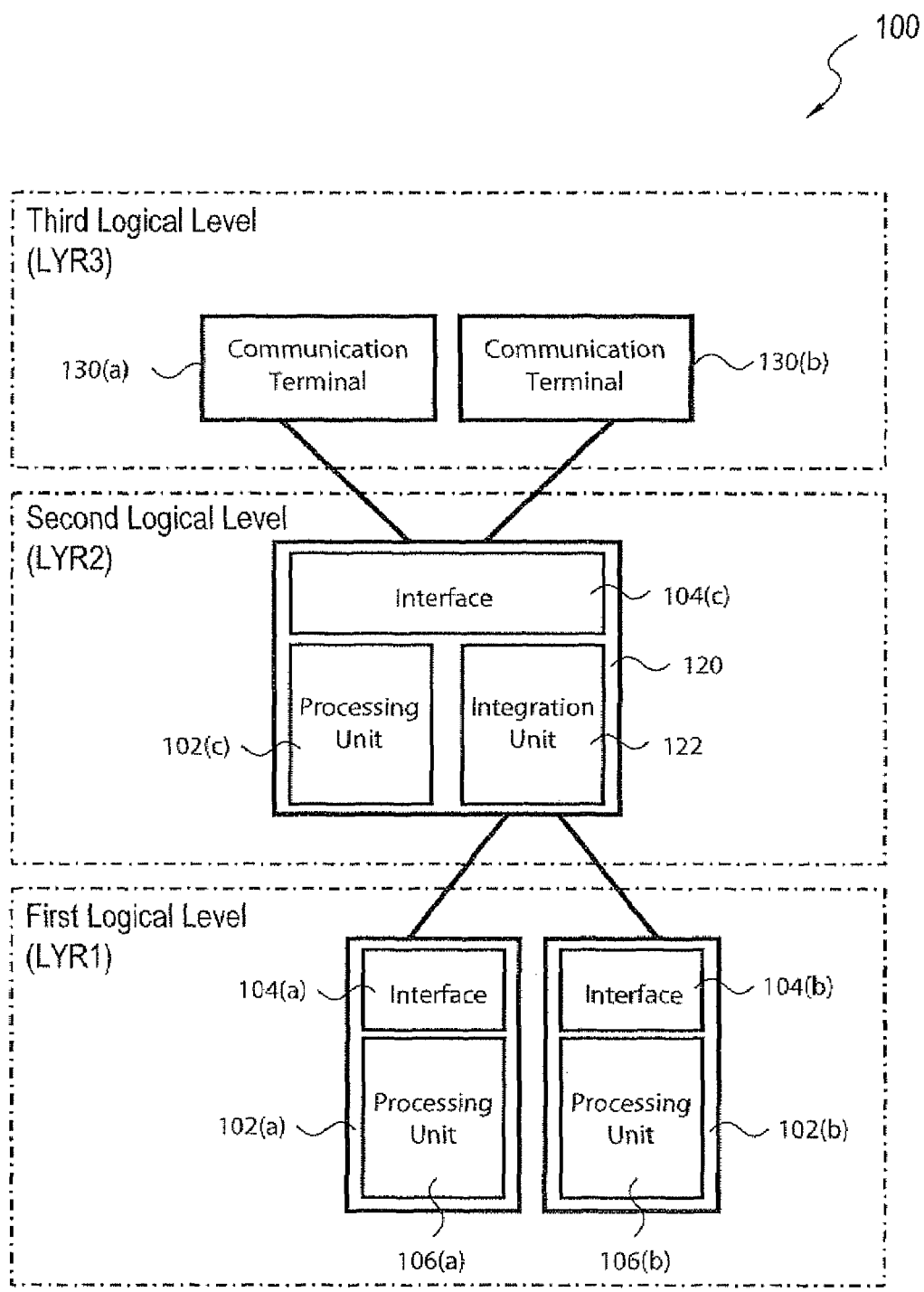
FIG. 1: shows a block diagram to illustrate schematically the logical levels within an inventive communication system.

FIG. 1 shows a communication system 100 divided into three logical levels LYR1, LYR2, LYR3. The communication system 100 is a part of a packet-oriented network (not shown). This means that each of the functional components described in more detail below has the capability of a packet-oriented data exchange with the packet-oriented network.

A first master computer 102(a) assigned to a first logical level LYR1 has—in addition to further functional units (not shown)—a first processing unit 106(a) and a first interface 104(a). A second master computer 102(b) also assigned to the first logical level LYR1 correspondingly has a second processing unit 106(b) and a second interface 104(b).

A proxy master computer unit assigned to a second logical level LYR2 and hereafter also referred to as the proxy server 120, is connected to the first interface 104(a) of the first master computer 102(a) and the second interface 104(b) of the second master computer 102(b) via the packet-oriented network (not shown). In the drawing this "connection" via a packet-oriented network is shown with a solid line. Such a "connection" thereby serves only to illustrate a communication relation via a—by its nature connectionless per se—packet-oriented network.

The proxy server 102 has—in addition to further functional components (not shown)—an integration unit 122, a processing unit 102(c) and an interface 104(c).

The proxy server 120 is connected via its interface 104(c) to a first and a second communication terminal 130(a), 130(b). The first communication terminal 130(a) and the second communication terminal 130(b) are assigned to a third logical level LYR3.

To illustrate interoperability with different communication protocols, it is assumed below that the first master computer 102(a) is a central administrative entity operating according to the H.323 communication protocol, also known in specialist terminology as a gatekeeper.

The second master computer 102(b) corresponds to an administrative entity operating according to the SIP communication protocol. In the case of the communication protocol SIP this administrative entity is generally subdivided into a plurality of units (not shown) such as a SIP proxy server, a redirect server, a registrar and a location server, while one unit in the form of the second master computer 102(b) is used as the basis for the drawing for reasons of clarity.

The first master computer 102(a) exchanges messages configured according to the H.323 communication standard with H.323-compatible terminals (not shown) via an interface (not shown). In a similar manner the second master computer 102(b) exchanges messages configured according to the SIP communication standard with SIP-compatible terminals (not shown) via an interface (not shown).

At the first interface 104(a) of the first master computer 102(a) messages exchanged in the form of data packets are however not configured according to the H.323 communication standard. In a similar manner the messages exchanged at the second interface 104(b) of the second master computer 102(b) are not configured according to the SIP communication standard. The messages exchanged at the first or second interface 104(a), 104(b) are specifically exchanged in a different format that can be processed for the integration unit 122 of the proxy server 120, as will be examined in more detail below.

After this illustration of hardware components to describe the physical structure of the communication system 100, the functional units shown in FIG. 1 are considered below with regard to their function and communication relations in respect of each other. The three logical levels LYR1, LYR2, LYR3 define an organization form according to a so-called 3-tier model, in which units in the form of hardware and/or software exchange data with each other.

For the purposes of structural consideration, the units referred to above as communication terminals within the third logical level LYR are introduced as first and second service users 130(a), 130(b). A service user 130(a) or 130(b) or a service user unit 130(a), 130(b) is often also referred to in specialist circles as a client and it implements calls for functions, which are provided for example by a so-called service provider or service provider unit—in specialist circles often also referred to as a server.

The functions called by the service user units 130(a), 130(b) are provided by the service provider unit 120 previously referred to as the proxy server. For the service user units 130(a), 130(b), this service provider unit 120 therefore acts as a so-called service provider.

The mode of operation of the logical levels LYR1, LYR2, LYR3 can now be summarized as follows based on this architecture of the communication system 100:

The first logical level LYR1 provides native signaling functions of communication protocols such as H.323 and SIP.

The second logical level LYR2 abstracts these native signaling functions and supplies these to the third logical level LYR3 in the form of (VoIP) communication services as so-called web services.

The third logical level LYR3 corresponds to client software. Based on the supplied implementation of said client software a designer is able to implement a VoIP solution using the communication services provided by the second logical level LYR2. The client software thereby includes only the functions which are essential for the clients, i.e. the service users 130(a), 130(b) such as the management of a useful data exchange and the codec functions used for this. Service users 130(a), 130(b) use the conimunication services provided by the second logical level LYR2 for execution in their own applications. These applications are implemented for example in a communication terminal or on a computer system.

The respective service user 130(a), 130(b) sends requests for the establishment of a connection to the service provider 120 and awaits confirmation or rejection of said request. This request is independent of the communication protocol—SIP or H.323—used in the first logical level LYR1 for the actual establishment of the connection but is configured as a call for communication services. This call for communication services is protocol-neutral and is effected for example based on the XML standard (Extended Markup Language). If the request is confirmed, the service user 130(a), 130(b) receives parameters with the confirmation such as port number and coding method, which are to be used for the subsequent exchange of useful data (not shown). This exchange of useful data and associated media processing is completely separate from the exchange of signaling data.

Communication connections between different logical levels are described in more detail below with further reference to the functional units in FIG. 1.

Figure 2:
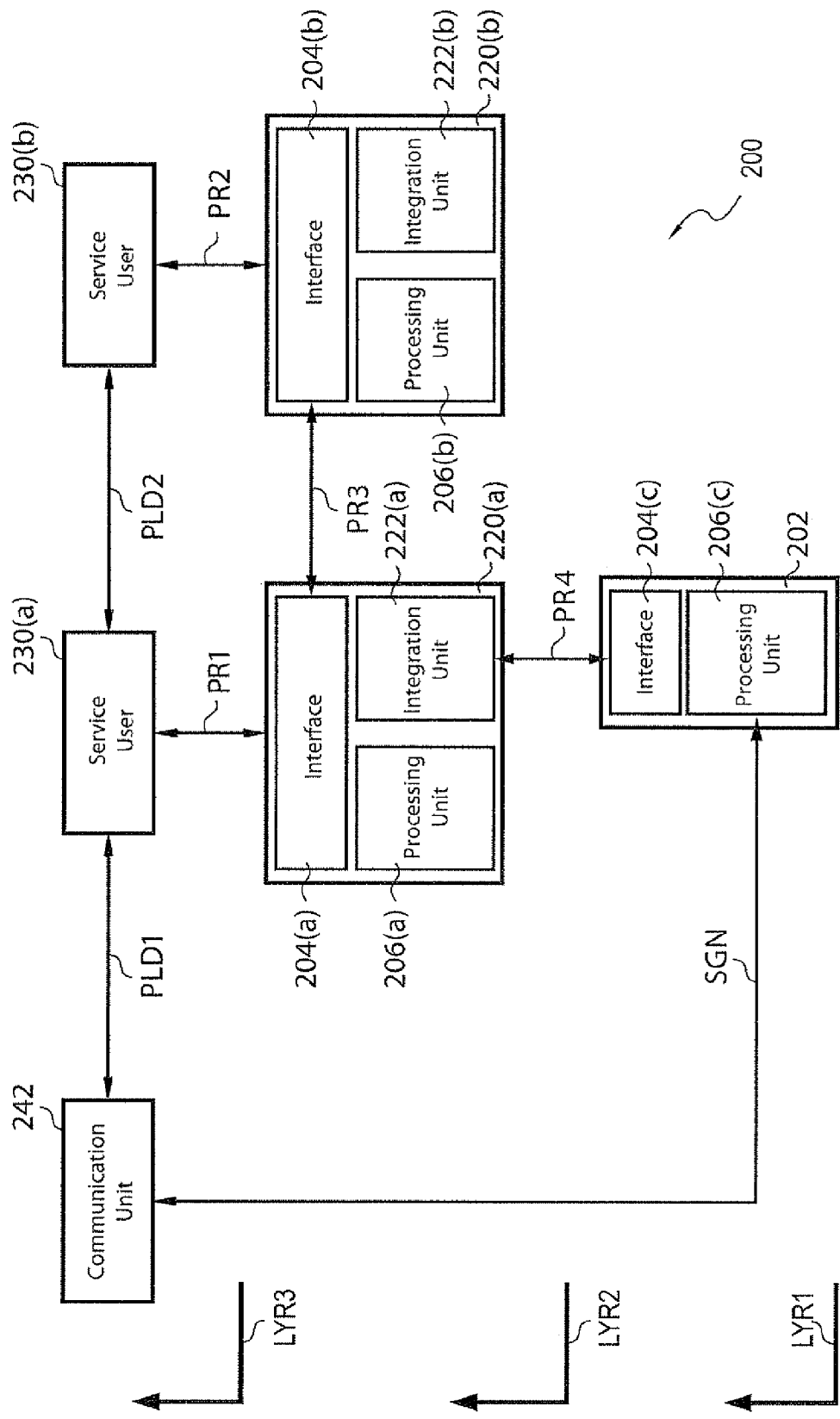
FIG. 2: shows a block diagram to illustrate schematically the signaling data and useful data exchanged within the communication system and also communication service calls.

FIG. 2 shows an exchange of messages or function calls between different functional units known to an extent from FIG. 1 and the logical levels LYR1, LYR2, LYR3. For the sake of clarity the logical levels LYR1, LYR2, LYR3 are only symbolized by direction arrows unlike the diagram in FIG. 1.

A further communication unit 242 is arranged in the third logical level 242 in addition to the service users 230(a), 230(b).

Unlike FIG. 1 it is assumed in the exemplary embodiment to be described below that two service provider units 220(a), 220(b) are arranged in the second logical level of the communication system 200 and only one master computer 202 is arranged in the first logical level LYR1. The master computer 202 is for example in the form of a central SIP administration entity.

The communication unit 242 is correspondingly in the form of a SIP communication terminal and exchanges with the master computer 202 on the basis of signaling messages SGN configured according to the SIP standard.

The communication users in the method to be described below are in particular the communication unit 242, the first service user 230(a) and the second service user 230(b).

In the case of an existing communication connection between the communication unit 242 and the first service user 230(a), useful data PLD1 is exchanged directly between the communication unit 242 and the first service provider 230(a).

A similar direct exchange of useful data PLD2 also takes place in the case of an existing communication connection between the first and the second service user unit 230(a), 230(b).

The first service user unit 230(a) uses a first service call PR1 via the first interface 204(a) of the first master computer 220(a) to call up the latter's communication services or web services.

The second service user unit 230(b) correspondingly uses a second service call PR2 to call up communication services of the second master computer 220(b).

An exchange of data also takes place between communication services of the first master computer 220(a) and communication services of the second master computer 220(b) via a third service call PR3.

The functional units located in the first logical level LYR1 are only used in the method provided according to the invention, if a calling or called communication partner can only be addressed via one of the supported communication protocols—SIP in the exemplary embodiment.

A request to establish a connection initiated from the third logical level LYR3, for example by the first connection taker 230(a) using the communication unit 242 is routed in such a case via the second logical level LYR2 to the first logical level LYR1, whereby necessary parameters within the signaling information—e.g. call number and characteristics of the calling user—are forwarded in corresponding messages or communication function calls PR1, PR2.

Signaling messages SGN are then exchanged between the called communication unit 242 and the master computer 202 in the first logical level LYR1. The signaling messages SGN are used at the time of establishment of the communication connection for example to agree which port and codec should be used for the communication to be set up. After the end of this signaling phase, confirmation of a successfully established connection and result parameters accompanying this are returned via the second logical level LYR2 and via the third logical level LYR3 to the calling communication unit 242 for voice transmission and monitoring of the communication connection.

From the point of view of the called communication unit 242 the exchange of messages in the logical level LYR1 corresponds to communication with a SIP proxy server or in an alternative embodiment with an H.323 gatekeeper, depending on which of the two communication protocols was used to exchange signaling messages with the communication unit 242.

From the point of view of the calling first service user 230(a) in the third logical level LYR3 this message exchange remains hidden. In this level LYR3 only abstracted communication services PR1 are called up and parameters returned relating to said services PR1.

If however the called communication partner is arranged in the third logical level LYR3 like the calling communication partner, in other words for example in the case of a request for a connection between the first and second service users 230(*a*), 230(*b*), the connection is established directly on the second logical level LYR2.

For this purpose the service provider units 220(*a*), 220(*b*) arranged in the second logical level LYR2 are responsible for all the steps required to establish the counection and the associated parameters, such as the request for establishment of the connection, the capacity interrogation, request confirmation, etc.

Figure 3:
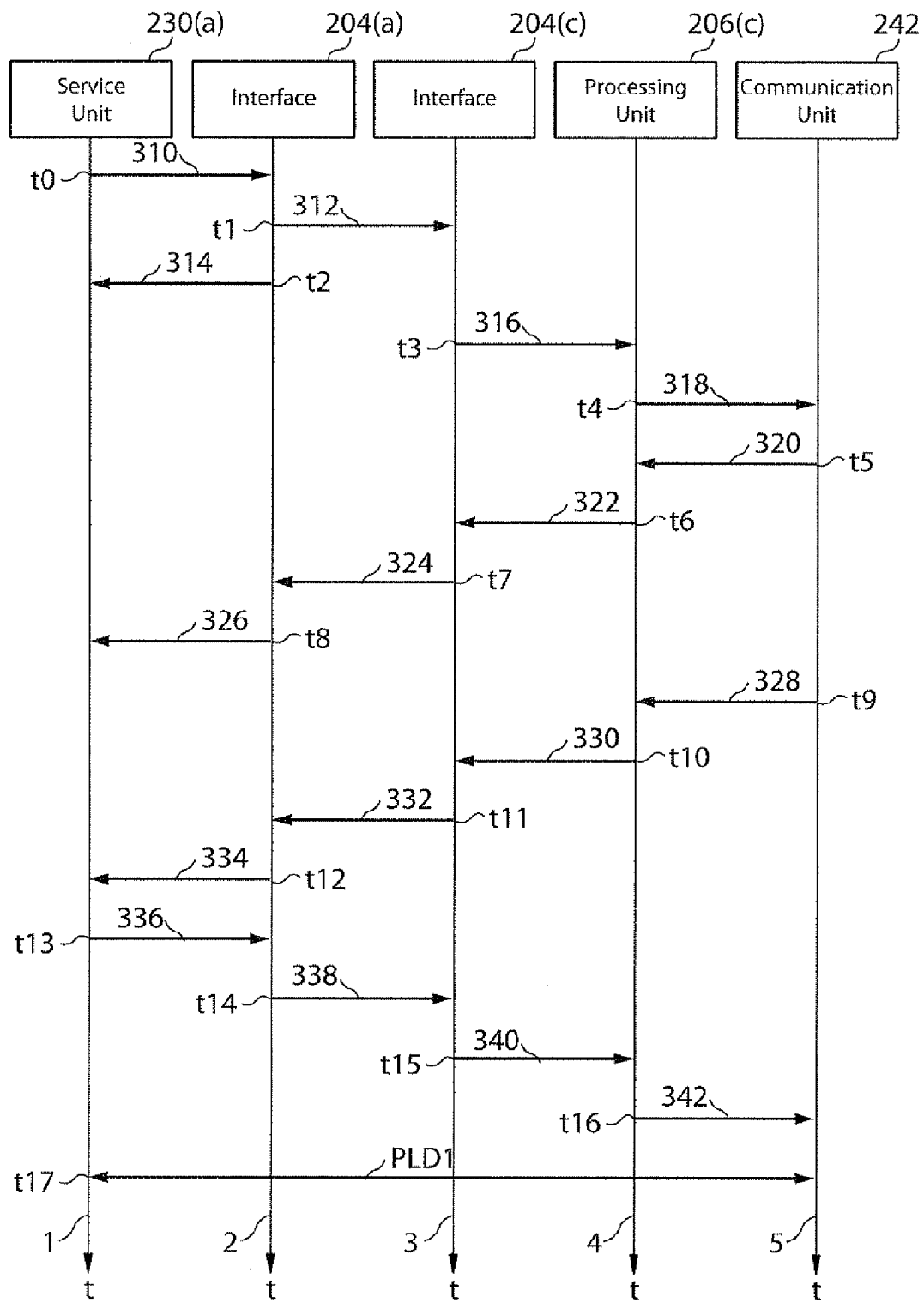
FIG. 3: shows a chronological flow diagram to illustrate schematically an exchange of signaling messages and control messages to establish a connection between a service user unit and a communication unit.

FIG. 3 shows a chronological flow diagram with further reference to the functional units in FIG. 2 to illustrate schematically an exchange of signaling messages and control messages during the establishment of a connection between the calling first service user unit 230(*a*) and the called communication unit 242.

The time lines 1,2,3,4 and 5 are assigned in this order to the first service provider unit 230(*a*), the second interface 204(*a*) of the first service provider unit 220(*a*), the first interface 204(*c*) of the communication master computer 202, the first processing unit 206(*c*) of the communication master computer 202, and the communication unit 242. The time lines 1,2,3,4 and 5 run from top to bottom, so that later times t are lower down than earlier times t.

At a time t0 the first service user unit 203(*a*) calls up the communication service CALL to establish a connection to a communication partner to be specified in parameters. This call is sent via a prompt 310 containing further parameter from the service user unit 203(*a*) to the assigned first service provider unit 220(*a*) received by the first interface 204(*a*) of the first service provider unit 220(*a*). As it is already known in the first service provider unit 220(*a*) on the second logical level LYR2 due to a previous registration of the service user unit 230(*a*) which coding methods or codecs the service user unit 230(*a*) uses or a preferred sequence for their use, it is not necessary for the service user unit 230(*a*) specify these parameters in the previous prompt 310 and they do not have to be specified additionally in every method call.

The service provider unit 220(*a*) receives the request for a service call sent with the prompt 310, processes the parameters contained in the prompt 310 and at a time t1 generates a further prompt 312 directed to the first logical level LYR1, which is received at the first interface IF1 of the SIP master computer 202. This prompt 312 contains a connection identification number identifying the current connection request, also referred to as Call ID, which is allocated by the service provider unit 220(*a*).

At a time t2 a confirmation message 312 is transmitted from the first interface 204(*a*) of the first service provider unit 220(*a*) to the first service user unit, generally referred to in specialist circles as an acknowledge message 314. This confirmation message 314 sent from the first service provider unit 220(*a*) via the first interface 204(*a*) reports the ongoing processing of the connection set-up initiated with the prompt 310.

During subsequent processing in the first logical level LYR1 all the parameters received with the prompt 312 are extracted from said message and transformed into a standard SIP invite request. SIP session set-up is then started.

At a time t3 this SIP invite request is generated in the form of an invite message 316 by the first interface 204(*c*) of the master computer 202 based on the prompt 312 and using the parameters contained therein and transmitted to the first processing unit 206(*c*) of the master computer 202. As with the previous comments on the distributed nature of the SIP master computer 202, it should be noted here that in an alternative embodiment the first processing unit 206(*c*), the converting first interface 204(*c*) and the SIP master computer 202 are implemented in distributed systems, which communicate with each other via the packet-oriented network (not shown).

At a time t4 SIP session set-up is started by the first processing unit 206(*c*) and an invite message 318 is sent to the communication unit 242. The first processing unit 206(*c*) takes over the role of a SIP proxy in respect of the communication unit. In the present exemplary embodiment the communication unit 242 is in the form of a so-called SIP user agent.

At a time t5 a signaling message 320 is sent from the first communication unit 242 to the first processing unit 206(*c*). After successful verification of the readiness of the conimunication unit 242 to receive the connection request, the signaling message 320 reports successful signaling of the connection request, which is generally effected with call signaling in conventional communication units. In the case of a preferred implementation of the communication unit in the form of a software application in the exemplary embodiment, a number of other signaling forms can be implemented in addition to acoustic signaling to indicate an incoming connection request. The signaling message 320 is also referred to as ringing in SIP terminology, based on conventional signaling forms. According to SIP conventions this signaling message is categorized with code 180.

At a time t6 the signaling message 320 received by the first processing unit 206(*c*) is forwarded in the form of a further signaling message 322 to the first interface 204(*c*). Optionally some of the parameters contained in the previous signaling message 320 are modified by the first processing unit 206(*c*) before it is forwarded in the form of the signaling message 322.

At a time t7 a signaling message 324 is sent by the first interface 204(*c*) to the second interface 204(*a*) located on the second logical level LYR2, in which data from the previous signaling message 322 contained in a SIP format is transformed to a format anticipated by the second interface 204(*a*), e.g. XML. The signaling message 324 is now processed in the service provider unit PRX and assigned to the previously started communication service using the determined call ID.

Finally at a time t8 acknowledgement of the called communication service is given to the calling first service user unit 230(*a*) in the form of a signaling message 326 by means of signaling to the called communication unit 242.

If a user of the called communication unit 242 receives the connection request, at times t9, . . . , t12 respectively confirmation messages 328, 330, . . . , 334 are sent from the communication unit 242 to the first service user unit 230(*a*). The first confirmation message 328, structured in a SIP format—in SIP terminology also referred to as OK and categorized as code 200 according to SIP conventions, is similarly received finally as acknowledgment of the called communication service in the form of the confirmation message 334 at the first service user unit 230(*a*). If connection set-up is rejected by the called communication unit, a reason for the rejection is contained in the—in this instance negative—confirmation message 334, which is transmitted in an XML format to the first service user 230(*a*).

If a positive confirmation message 334 reaches the first service user 230(*a*), at times t13, . . . , t16 respectively backward confirmation messages 336, 338, . . . , 342 are similarly sent from the first service user unit 230(*a*) to the communication unit 242. The first confirmation message 336 in an XML format is sent by the first service user 230(*a*), if this latter agrees to the communication connection.

A direct useful data connection PLD1 is then established between the first service user 230(*a*) and the called communication unit 242.

Figure 4:
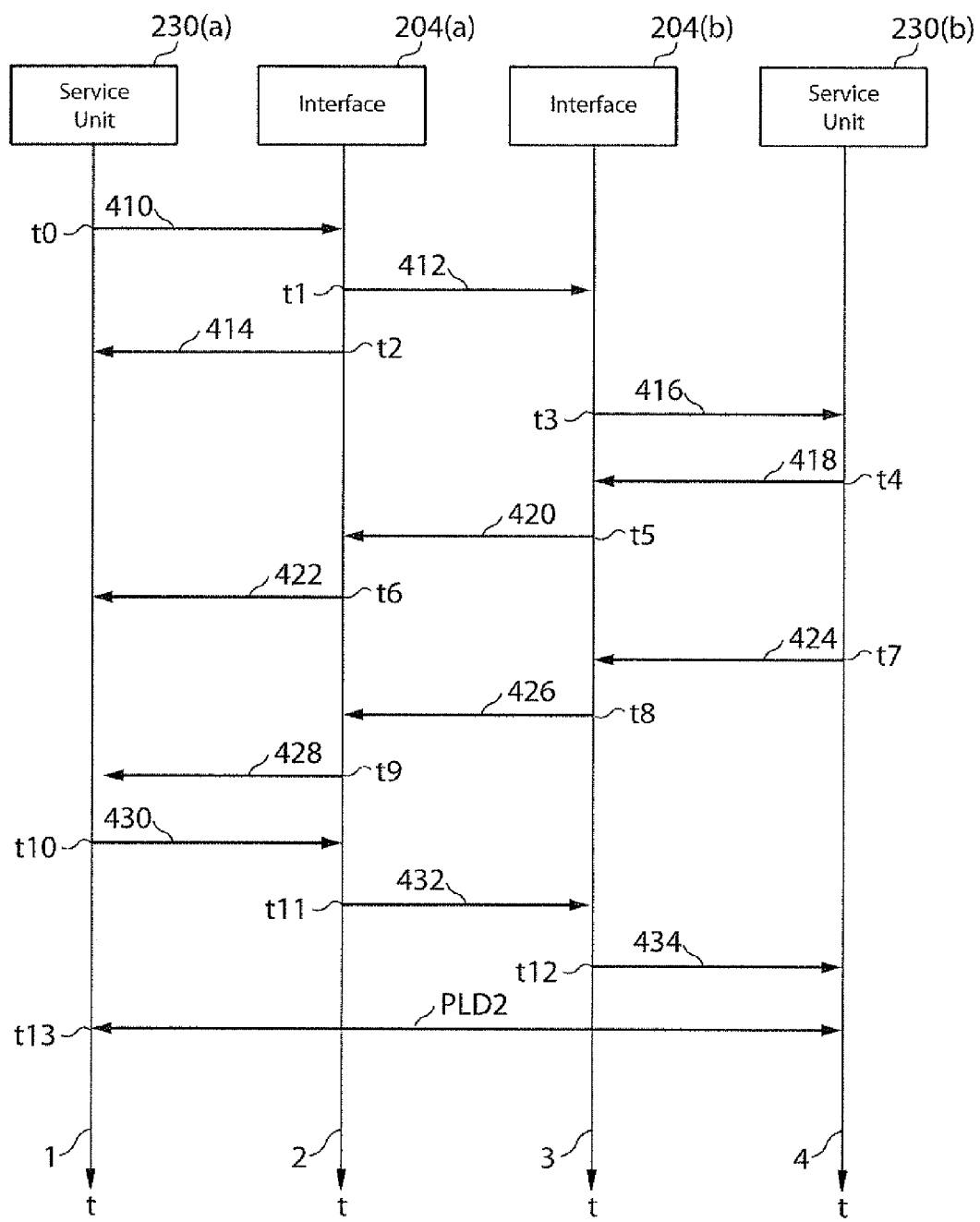
FIG. 4: shows a chronological flow diagram to illustrate schematically an exchange of signaling messages and control messages to establish a connection between two service user units.

FIG. 4 shows a chronological flow diagram with further reference to the functional units in FIG. 2 to illustrate schematically an exchange of signaling messages and control messages during the establishment of a connection between the calling first service user unit 230(a) and the called second service user unit 230(b).

The time lines 1,2,3,4 and 5 are assigned in this order to the first service provider unit 230(a), the second interface 204(a) of the first service provider unit 220(a), the second interface 1F2.2 of the second service provider unit 220(b) and the communication unit 242. The time lines 1, 2, 3 and 4 run from top to bottom, so that later times t are lower down than earlier times t.

If as in the present exemplary embodiment, a communication connection is to be established between two service user units 230(a), 230(b), functional units of the first logical level LYR1 are not required. From the point of view of the calling service user unit 230(a) communication with the second logical level LYR2 is identical to the exemplary embodiment in FIG. 4.

At a time t0 the first service user unit 230(a) calls up a communication service CALL to establish a connection to a communication partner to be specified in parameters. This call is sent from the service user unit 230(a) to the assigned first service provider unit 220(a) via a prompt 410 containing further parameters and received by the first interface 204(a) of the first service provider unit 220(a). As it is already known in the first service provider unit 220(a) on the second logical level LYR2 due to a previous registration of the service user unit 230(a) which coding methods or codecs the service user unit 230(a) uses or a preferred sequence for their use, it is not necessary for the service user unit 230(a) to specify these parameters in the previous prompt 310 and they do not have to be specified additionally in every method call.

The service provider unit 220(a) receives the request for a service call sent with the prompt 410 and processes the parameters contained in the prompt 410. From a paranwter sent to identify the called communication user, the second service user unit 230(b), it is particularly clear to the service provider unit 220(a) that the called user like the calling user is associated with the third logical level LYR3.

Then at time t1 a prompt 412 is sent to call up a communication service on the service provider unit 220(b) associated with the second service user unit 230(b). This prompt 412 contains parameters required for the communication connection and is sent from the first interface 204(a) of the first service provider unit 220(a) to the second interface IF2.2 of the second service provider unit 220(b).

At a time t2 a confirmation message 414 is transmitted from the first interface 204(a) of the first service provider unit 220(a) to the first service user unit 230(a), which is also referred to in specialist circles as an acknowledge message 414. This confirmation message 414 sent from the first service provider unit 220(a) via the first interface 204(a) reports the ongoing processing of the connection set-up initiated with the prompt 410.

At a time t3 a prompt 416 is sent from the second interface IF2.2 of the second service provider unit 220(b) to the second service user unit 230(a). This prompt 416 has an XML structure and forwards the request initiated with the prompt 410 to establish a communication connection or call request directly to the second service user unit 230(b), optionally with the addition of further administrative parameters by the service provider units 220(a), 220(b).

After successful verification of the readiness of the second service user unit 230(b) to receive the connection request, signaling messages 418,420,422 sent at times t4,t5,t6 report successful signaling of the connection request, which is effected with call signaling in conventional communication units. The signaling messages 418,420,422 are therefore also referred to as ringing.

If a user of the called second service user unit 230(b) receives the connection request, at times t7,t8,t9 respectively confirmation messages 424,426,428 are sent from the second service user unit 230(b) to the first service user unit 230(a). The first confirmation message 424, structured in an XML format—also referred to as OK—is similarly received finally as acknowledgment of the called communication service in the form of the confirmation message 428 at the first service user unit 230(a). If connection set-up is rejected by the called second service user unit 230(b), a reason for rejection is contained in the—in this instance negative—confirmation message 428.

If a positive confirmation message 428 reaches the first service user 230(a), at times t10,t11,t12 respectively backward confirmation messages 430,432,434 are similarly sent from the first service user unit 230(a) to the second service user unit 230(b).

FIG. 3 shows a chronological flow diagram with further reference to the functional units of FIG. 2 to illustrate schematically an exchange of signaling messages and control messages during the establishment of a connection between the calling communication unit 242 and the called first service user unit 230(a).

It is however assumed with reference to the exemplary embodiment shown according to FIG. 5 that the calling communication unit 242 is provided for an exchange of messages based on the SIP communication protocol. The comrminication protocol present in the communication system 200, particularly SIP or H.323, however essentially has no influence on the successful implementation of the inventive method. In particular the inventive method can also be implemented even in the case of a plurality of different communication protocols, as already set out clearly with reference to the diagram in FIG. 1.

The time lines 1,2,3,4 and 5 are assigned in this order to the communication unit 242, the first execution unit 206(c) assigned to the SIP communication master computer 202 the first interface 204(a) assigned to the first service provider unit 220(a), the first interface 204(c) assigned to the SIP communication master computer 202 and the first service provider unit 230(a). The time lines 1,2,3,4 and 5 run from top to bottom, so that later times t are lower down than earlier times t.

At a time t0 the first communication unit 242 sends a prompt 510 in a SIP format to establish a connection with a communication partner, also referred to as a SIP INVITE. This prompt is sent from the communication unit 242 to its assigned SIP master computer 202 and received by the latter's processing unit 206(c). The processing unit takes over the role of a SIP proxy. The communication partner specified using parameters in the prompt 510, namely the first service user unit 230(a), is not controlled by the processing unit 206(c) of the SIP communication master computer 202, so the prompt 510 is forwarded by this latter at time t1 in the form of the largely unmodified processing message 512 to the second logical level LYR2, more specifically to the first interface 204(a) of the service provider unit 220(a) there.

From the point of view of the first service user unit 230(a) functional units in the second logical level LYR2 interact with the first interface 204(a) like a proxy, i.e. all the bi-directional signaling messages described below operate via this level LYR2.

At a time t2 the previously received prompt 512 is forwarded via the first interface 204(*a*) of the communication master computer 220(*a*) to the interface 204(*c*) of the SIP communication master computer 202. This forwarding is effected as an appendix to a message, which is otherwise effected in a format provided for communication between these two interfaces 204(*a*), 204(*c*), e.g. in an XML format.

In the first logical level LYR1 a SIP INVITE request, i.e. an invitation in the communication protocol SIP, is identified from this appendix to the message 514 and sends a prompt 516 in XML format at time t3 via the interface 204(*c*) to the first interface 204(*a*) of the communication master computer 220(*a*) to call up a communication service CALL.

In the service provider unit 220(*a*) on the second logical level LYR2 a communication service call—or call request—is identified for the controlled service user unit 230(*a*), whereupon at time t4 a corresponding prompt 518 in an XML format is sent from the first interface 204(*a*) of the communication master computer 220(*a*) to the first service user unit 230(*a*).

Before an operator or a software application decides to accept the communication connection requested by means of the prompt 518, at time t5 a signaling message 520—also referred to as ringing—is sent to the first interface 204(*a*) of the communication master computer 220(*a*).

At time t6 this signaling message 520 is passed on in the form of a forwarded signaling message 522 to the first logical level LYR1 or to the interface 204(*c*).

The signaling message 522 received at the first interface 204(*c*) is evaluated and a corresponding SIP signaling message 524—categorized as code 180 according to SIP conventions—is transmitted to the processing unit 206(*c*) acting as the SIP proxy.

At a time t8 this SIP signaling message 524 in the form of a further SIP signaling message 526 is forwarded from the processing unit 206(*c*) to the SIP communication unit 242.

If a user of the called first service user unit 230(*a*) receives the connection request, at times t9, . . . , t12 respectively confirmation messages 528,530, . . . , 534 are then sent from the first service user unit 230(*a*) to the communication unit 242. The confirmation massages 528, . . . , 534 exchanged at times t9, . . . , t12 correspond in the counter direction to the exchanged confirmation messages 328, . . . , 334 known from FIG. 3 except that the message are only routed via the interface 204(*a*) acting as a proxy in the second logical level LYR2.

At time t9 a first call of a communication service confirming acceptance of the connection—Response or ok—is sent in the form of the confirmation message 528 first to the interface 204(*a*) acting as proxy in the second logical level LYR2, which transmits said confirmation message 528 at time t10 in the form of confirmation message 530 to the interface 204(*c*). The confirmation message 530 received at the first interface 204(*c*) is evaluated and a corresponding SIP confirmation message 532—in SIP terminology also referred to as OK and categorized according to SIP conventions as code 200—is transmitted to the processing unit 206(*c*) acting as the SIP proxy, from whence it is finally transmitted at time t12 as a SIP confirmation message 534 of the SIP communication unit 242.

If a positive confirmation message 534 reaches the SIP communication unit 242, at times t13, . . . , t17 respectively backward confirmation messages 536,538, . . . , 544 230(*a*).

The invention claimed is:

1. An arrangement for controlling communication connections in a packet-oriented communication system, comprising:
    at least one communication master computer for controlling communication connections based on exchanged signaling messages; and
    at least one service provider unit for providing communication services for establishing and controlling connections based on bi-directional communication service calls with at least one service user unit, each service provider unit comprising an interface to couple the respective unit with the at least one service user unit,
    wherein each communication master computer comprises an interface to couple the respective computer with the at least one service provider unit,
    wherein each service user unit registers with the coupled service provider unit such that the service provider unit includes preferred parameters of the respective registered unit,
    wherein the at least one service user unit invokes the web services based communication service via a service call, the service call independent of a standard signaling protocol,
    wherein the at least one service provider unit having the invoked service sends a message having parameters to the at least one master computer, the message having a protocol independent of the standard signaling protocol,
    wherein the at least one master computer converts the parameters to a standard signaling protocol message and sends the message to a communication unit.

2. The arrangement according to claim 1, wherein the service provider unit is configured as a proxy master computer unit for communication between the at least one service user unit and the at least one communication master computer.

3. The arrangement according to claim 1, wherein the signaling message comprises a sequence of signaling messages.

4. The arrangement according to claim 1, wherein the standard signaling protocol is based according to the SIP protocol or the H.323 protocol.

5. The arrangement according to claim 1, wherein, after a successful establishment of a communication connection, a direct exchange of payload data between the service user units and/or between at least one service user unit and a communication unit assigned to the communication master computer is performed.

6. The arrangement according to claim 1, wherein the invoking of the services is based on XML.

7. The arrangement according to claim 1, wherein the communication services are web services.

* * * * *